United States Patent Office 3,497,550
Patented Feb. 24, 1970

3,497,550
POLYMERIZABLE MONOMERS, COPOLYMERS THEREOF AND ADHESIVE MADE THEREFROM
Carlos M. Samour, Wellesley Hills, Mass., assignor to The Kendall Company, Boston, Mass., a corporation of Massachusetts
No Drawing. Filed Nov. 7, 1966, Ser. No. 592,338
Int. Cl. C07c *69/60;* C08f *15/16;* C09j *3/14*
U.S. Cl. 260—485                                       6 Claims

ABSTRACT OF THE DISCLOSURE

Monoesters of maleic, itaconic or citraconic acid with an alcohol having the structure $RR_1N-R_2-OH$ where R is an alkyl group of 1–28 carbon atoms, $R_1$ is hydrogen or an alkyl group of 1–10 carbon atoms, and $R_2$ is an alkenyl group of 2–3 carbon atoms, and mixtures of such esters in which the R groups differ in number of carbon atoms. Copolymers of such esters with alkyl acrylates or methacrylates. Adhesive sheet material in which the adhesive layer includes such a copolymer.

---

This invention relates to polymers and to novel monomers for use in making such polymers, and pertains more specifically to pressure-sensitive adhesive polymers, and to flexible sheet material coated with such polymers, including pressure-sensitive adhesive tape.

A long sought for objective of the pressure-sensitive adhesive tape industry has been the simplification of adhesive masses from multi-component recipes to less complex formulas, ideally containing a single ingredient which per se functions as a pressure-sensitive adhesive. The motivation for this objective is readily apparent in view of the complexity of the adhesive masses employed in the majority of tapes now on the market and most certainly is readily appreciated by those having experience in supply, quality control and processing problems in the manufacture of multi-component products. The ideal objective of a single ingredient pressure-sensitive adhesive (exclusive of other materials which may be added thereto for reasons incidental to or to implement its inherent adhesive properties) may indeed seem unattainable to the formulator of conventional multicomponent pressure-sensitive adhesives. Pressure-sensitive adhesives are characterized by essentially three properties: tack, adhesion and cohesion. These properties are generally interdependent, for steps or means used to influence one can cause a change in one or more of the other properties, oftentimes at a sacrifice thereto.

Among the materials which received early attention as a possible single-component pressure-sensitive adhesive were the homopolymers of esters of acrylic acid. Acrylate homopolymers, as was known, exhibit properties of varying degrees of softness or hardness and tackiness, depending largely upon the type of alcohol or mixtures of alcohols from which the esters are prepared. Briefly, it was known that as the number of carbon atoms of the straight chain alkyl group of the alcohol increases, the homopolymers progress from tough, rubbery and moderately hard polymers, to soft, less tough and more rubbery polymers, to soft, tacky polymers, to hard, brittle and waxlike polymers. The homopolymer of the n-butyl acrylate monomer is soft and tacky and the trend to softer and tacky polymers continues until the n-alkyl group of the ester contains about 8 carbon atoms. Thereafter, the trend is to hard, brittle, crystalline and wax-like polymers derived from n-alkyl acrylates, such as n-hexadecyl acrylate and n-octadecyl acrylate. Polymer molecular weight also influences the properties of rubberyness, tackiness, softness, toughness, hardness and brittleness. Acrylates which by themselves are known to form solid, tacky-soft polymers are esters of acrylic acid and primary and secondary alkyl alcohols containing from 4 to about 12 carbon atoms. Esters of acrylic acid and tertiary-alkyl alcohols, such as t-butyl alcohol and t-amyl alcohol homopolymerize into relatively hard and tack free polymers. Polymethacrylates exhibit a similar trend in properties but, generally are free of appreciable tack and are more rubbery, more rigid and tougher than the corresponding polyacrylates.

The acrylate homopolymers proposed in the prior art as adhesives are said to be deficient in either aggressive tackiness or, if aggressively tacky, deficient in cohesive strength. Proposals have been made to overcome the deficiencies of homoacrylate adhesive polymers by copolymerizing minor amounts of various other monomers with the acrylates. These other monomers include divinyl monomers, diesters of fumaric acid and polar comonomers such as acrylic acid. Ordinarily, these other monomers are present in the polymer as additive monomers and not as principal monomers. Thus, examples in the prior art show that about 1% by weight of diallyl succinate or up to about 25% by weight of $C_4$–$C_6$ dialkyl fumarates may be copolymerized with alkyl acrylates containing up to about 6 carbon atoms in the alkyl groups thereof. Up to about 12% by weight of polar comonomers such as acrylic acid may be copolymerized with alkyl acrylates averaging no more than about 12 carbon atoms in the alkyl groups thereof. Pressure-sensitive adhesive polymers derived from methacrylate monomers or containing appreciable amounts of methacrylates are unknown.

An object of this invention is to provide novel monomers and to provide polymers of such monomers. Another object is to provide an adhesive composition and in a preferred embodiment an adhesive composition having sufficient cohesive strength to be useful as a pressure-sensitive adhesive. Other and further objects will be apparent from the description which follows.

The novel monomers of the present invention consist essentially of amino acid half esters having the structures

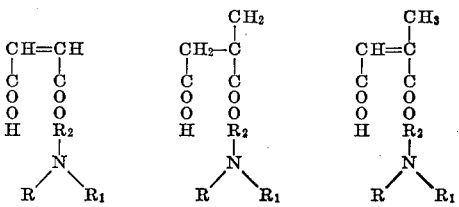

They are half esters of:
(A) An acid selected from the class consisting of alpha,beta and alpha,alpha ethylenically unsaturated dicarboxylic acids; i.e. maleic, itaconic and citraconic acids; with (B) Alkylaminoalkylene alcohols in which the alkyl group contains from 1 to 28 carbon atoms and the alkylene group contains from 2 to 3 carbon atoms, i.e. alcohols having the structure

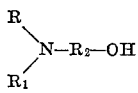

in which R is an alkyl group containing from one to 28 carbon atoms, $R_1$ is hydrogen or an alkyl group containing from one to 10 carbon atoms, and $R_2$ is an alkylenyl group having the structure —$CH_2CH_2$— or

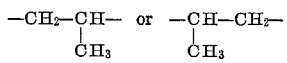

The monomers need not be chemically pure individuals within the class, but may in some cases desirably consist essentially of mixtures of different compounds within the class, the compounds of the mixture differing from each other only in the number of carbon atoms and/or extent of branching present in the alkyl groups R and/or $R_1$. In the case of such mixtures, the average number of carbon atoms in alkly group R should be from 8 to 24. These monomers are useful in making the polymers of the present invention which are particularly valuable as pressure sensitive adhesives.

These monomers are characterized by a unique combination of properties. The water insoluble monomers having large R and $R_1$ groups are however soluble in acidic and alkaline aqueous solutions. Those having $R>8$ carbon atoms have surface active properties either in alkaline or acidic aqueous system. They may be made simply by mixing the anhydride of maleic, itaconic, or citraconic acid with the appropriate alkylaminoalkanol. Surprisingly, the amino group does not react with the anhydride, but the hydroxyl group does. The reaction, which is exothermic, proceeds rapidly without catalyst and without the necessity for application of external heat. Preferably the reaction is carried out by dissolving the ingredients in stoichiometric proportions in an inner solvent such as isopropyl acetate, benzene, toluene, acetone, etc.

The polymers of the present invention, which are useful as viscosity improvers for lubricating oils, as binders for fibrous masses, as adhesives, and as tackifiers, i.e. as additives which increase the adhesiveness of other polymers or resins when mixed therewith, are those made by polymerizing one or more of the foregoing monomers together with an acrylic or methacrylic ester of an alkyl alcohol having from one to 14 carbon atoms; i.e. an ester having the structure

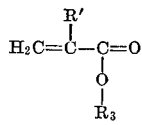

in which R' is either hydrogen or methyl and $R_3$ is an alkyl group containing from one to 14 carbon atoms.

Polymers exhibiting marginal tack and adhesive properties, are obtained generally in the case of those monomers in which R is a lower alkyl group, or an alkyl group which contains at most only a few branchings, or in which the monomer molecules all contain identical R alkyl groups. The marginal pressure sensitive properties of these polymers may be improved by the addition of plasticizers, tackifiers or both. Polymers exhibiting marginal cohesive properties may be used as label adhesives where clean strippability or high cohesive strength is not a requirement. These polymers may be crosslinked by means of conventional crosslinking agents, to produce pressure-sensitive adhesive compositions of more general utility, as for example, for masking tape. These marginal cohesive polymers may be used in combination with polymers having high cohesive strength for improving the tack and adhesion of the latter polymers or for improving the cohesive strength of the former type of polymers. Furthermore, when R is a lower alkyl group and $R_1$ is either hydrogen or an alkyl group containing up to 10 carbon atoms but the monomer of which they are a part may be pure, i.e. all of the molecules may contain identical alkyl groups, or it may be a mixture of molecules containing different alkyl groups. As the size of the R alkyl groups (and of the $R_1$ alkyl groups when present) increases, the monomer molecules containing them must consist to an increasing extent of molecules wherein the alkyl groups are branched and to an increasing extent of mixtures of different molecules in which the branched alkyl groups are not identical. The point at which the size of the alkyl groups is such as to require branching and the point at which the monomer must contain a mixture of different molecules is dependent upon a variety of factors, including the degree of tack and adhesion desired in a pressure-sensitive adhesive polymer and the composition of the acrylic or methacrylic ester polymerized with the monomer.

As a general guide in the preparation of polymers which are per se pressure-sensitive adhesive polymers, the half ester monomer should be a mixture of half ester molecules different from each other with respect to the size and/or configuration of the R alkyl groups and in which the number of carbon atoms in the R alkyl groups averages at least about 8, preferably at least about 10. The half ester molecules having R groups containing more than about 6 carbon atoms should consist essentially of those esters in which the alkyl groups are branched alkyl groups.

The preferred monomers for polymerization with the acrylic or methacrylic ester to form pressure-sensitive adhesive polymers having a probe tack value of at least about 100 grams, determined as hereinafter described, are products which vary from liquids to crystalline solids and which are soluble either in water or in the acrylic or methacrylic ester with which they are polymerized, the solubility being sufficient to permit practical emulsion polymerization. In general, the less crystalline is the monomer polymerized with the acrylic or methacrylic ester, the higher will be the tack of the polymer produced.

When the R alkyl groups of the monomer contain less than about 11 carbon atoms, the monomer may be either a liquid or crystalline solid. When the R alkyl groups contain more than about 6 carbon atoms, substantially all of the alkyl groups should contain at least one branch. When the R alkyl groups in the monomer contain an average of more than about 10 carbon atoms, the monomer must be substantially non-crystalline as well as being soluble in the acrylic or methacrylic ester. These requirements are met, as the average number of carbon atoms increases above 10, by increasing the extent of branching in the alkyl groups of individual molecules and by increasing the extent of mixing of molecules containing different alkyl groups.

The use of monomers containing R alkyl groups in which the average number of carbon atoms is greater than about 10 makes possible a wider choice of acrylic and methacrylic esters as well as a wider range of proportions of the latter in order to form a polymer having optimum adhesiveness.

When the $R_1$ groups in the monomer are alkyl, those which contain more than about 5 carbon atoms should be branched, for the most part, although it is not essential that all of such groups present be branched when the monomer contains a mixture of different molecules in which the alkyl groups are not identical. In general, the extent of branching in the $R_1$ alkyl groups need not be so great as in the R alkyl groups in order for the monomer to have the desired non-crystalline character.

The extent of branching in the branched alkyl substituents employed in the half-ester monomer component of this invention is proportional to the average number of groupings of single or consecutive non-branching carbon atoms therein and inversely proportional to the number of consecutive non-branching carbon atoms in such groupings. As used herein, the term "non-branching carbon atoms" means the carbon atoms that have no more than two carbons directly linked thereto. A branching carbon atom is a carbon atom that is directly attached to more than two carbon atoms. The possible number of branching carbon atoms and hence the possible number of branches are, of course, a function of the number of carbon atoms in the alkyl group. Thus, greater extent of branching is obtained not merely by an increase in the number of branches, as side chains, on the main chain of the alkyl groups, but by branching in the side chains also. A minimum extent of branching generally applicable to those alkyl groups required to be branched, as explained above, is that in which the branched alkyl groups have a maximum of one grouping containing from 5 to 6 consecutive non-branching carbon atoms.

The effect of branching in producing the above-stated tack level is further improved as the extent of mixing of monomer molecules having different $R_1$ groups increases. When such $R_1$ groups are different, all straight chain alkyl groups, there is little beneficial effect in mixing, even when in the case of the longer chain alkyl groups, (i.e. above six to eight carbon atoms), the straight chain alkyl groups in the mixture are not adjacent homologues. Adjacent homologues are those that differ from each other by one methylene group. The beneficial effect, however, is enhanced by mixing molecules containing different branched alkyl groups, even when the branched alkyl groups are adjacent homologues.

The preferred monomers for use in polymerizing with the acrylic or methacrylic ester to produce polymers having optimum adhesiveness are those which are liquid or semi-solid mixtures of molecules having different highly branched R groups containing up to about 28 carbon atoms in which the average number of carbon atoms of R in the mixture is from about 8 to about 24, the alkyl groups present in the mixture consisting principally of those having from 8 to 24 carbon atoms.

The preferred monomers may be prepared by esterifying the desired acid e.g. maleic, itaconic or citraconic, with mixed alkanolamines such as Priminox R–IM and Priminox T–IM, marketed by Rhom and Haas Company. Priminox R–IM is reported to be the reaction product with ethylene oxide of a mixture of tertiary-alkyl primary amines (Primene 81–R) having highly branched alkyl groups averaging 11 to 14 carbon atoms, with the nitrogen atom connected to a tertiary carbon atom. The neutralization equivalent of the amine mixture is reported to be 191, corresponding to alkyl groups having an average of about 12 carbon atoms. The ethylene oxide reaction product has a neutralization equivalent of 255, and is a mixture of tertiary alkylaminoethyl alcohols having alkyl groups corresponding to those of the primary amines from which they are made. Priminox T–IM is an analogues product prepared from a mixture of tertiary alkyl primary amines (Primene J–MT) averaging about 18 to 21 carbon atoms having a neutralization equivalent of 315, corresponding to alkyl groups having an average of about 21 carbon atoms. The ethylene oxide reaction product has a neutralization equivalent of 364, and is a mixture of tertiary alkylaminoethyl alcohols having alkyl groups corresponding to those of the primary amines from which they are made.

The $R_3$ alkyl groups which may be present in the acrylic or methacrylic esters used in making the polymers of the present invention may contain from 1 to about 14 carbon atoms, the average number of carbon atoms which may be present for best results depending upon the nature of the monomer with which it is polymerized, which in turn depends upon the size and extent of branching of the R alkyl groups and upon the extent of mixing of different molecules containing non-identical R alkyl groups. Generally, for optimum adhesiveness of the polymers, the acrylic or methacrylic ester is a mixture of different molecules in which the $R_3$ alkyl groups are non-identical, and the number of carbon atoms in the $R_3$ alkyl groups may average from about 3 to 13 when R is a lower alkyl group containing not more than about 6 carbon atoms. As the average size of R increases within the 7 to 10 carbon atom range and the extent of branching increases, the carbon atoms in the $R_3$ alkyl groups may average from 2 to 13. As the average size of R increases to within the 11 to 24 carbon atom range and the extent of branching of the R alkyl groups increases as well as the extent of mixing of molecules containing non-identical alkyl groups, the $R_3$ alkyl group may average from 1 to about 13 carbon atoms. Minor amounts of acrylic or methacrylic esters in which the $R_3$ groups contain more than 14 carbon atoms may be present, greater latitude in this respect being permitted in the case of esters having a greater extent of mixing of molecules containing non-identical $R_3$ alkyl groups. The $R_3$ alkyl groups may be straight-chain or branched or mixtures of both. Preferably, for polymers of optimum adhesiveness, the $R_3$ alkyl groups having more than about 9 carbon atoms should be branched. Mixtures of acrylic or methacrylic esters in which the $R_3$ alkyl groups are non-identical, particularly when the alkyl groups contain more than about 9 carbon atoms and are branched, offer wider latitude in the nature of the monomer containing the R and $R_1$ groups, but when the $R_3$ alkyl groups, or some of them, are branched, at least 50 mol percent of the acrylic or methacrylic ester should contain, for optimum adhesiveness of the polymer, $R_3$ alkyl groups attached to the rest of the ester molecule through a non-tertiary carbon atom.

The relative proportions of the two types of monomers used in preparing the polymers of the present invention may vary over a wide range. The weight ratio of alkylaminoalkylene ester to acrylic or methacrylic ester may be from about 1:19 to about 1:1, but preferably, for best results is no more than 1:2 by weight. The acrylic and methacrylic esters may be mixed with each other, if desired, in any proportion.

The polymers of the present invention may be prepared by polymerizing together the two types of monomers described above, i.e. an alkylaminoalkylene ester and an acrylic or methacrylic ester in any of the usual emulsion or solution polymerization procedures, preferably in aqueous emulsion using a redox catalyst system. They may also be prepared by polymerizing the acrylic or methacrylic ester together with the appropriate acid anhydride e.g. maleic anhydride, after which the polymer is esterified with the alkylaminoalkylene alcohol. While the latter procedure is more difficult and is therefore not preferred, it will be understood that the claims are intended to include the polymers no matter what procedure is used for making them.

Various types of catalysts useful in the polymerization of acrylate and methacrylate monomers may be employed in the production of the polymers of this invention. Examples of peroxide-type, free radical polymerization initiators are inorganic peroxides, such as hydrogen peroxide and barium peroxide; organic peroxides such as dicumyl peroxide, di-tertiary butyl peroxide, cumyl hydrogen peroxide, diacetyl peroxide and dibenzoyl peroxide; and inorganic per-acids, such as ammonium persulfate, potassium persulfate, and potassium percarbonate. These initiators can be used alone, or, preferably, in the presence of reducing agents such as ferrous salts, cuprous salts, bisulfite, thiosulfate, hydrosulfite and tetrathionate salts, dimethylaniline, triethanolamine, and alkylene polyamines. Other types of initating systems may be used for the preparation of these polymers, for example, ultraviolet light in the presence of organic peroxides or photosensitizers such as benzophenone.

As is well known in the art of polymerization, the choice of catalysts depends upon many factors. The type of monomers to be polymerized and the type of polymerization, whether solution, bulk or emulsion, determine the choice of catalyst. In the case of emulsion polymerization, the pH of the emulsion; the type of the emulsifier and the temperature of the emulsion also will influence the choice of catalysts. In general, the amounts of the initators used in the preferred emulsion polymerization system may vary from as low as 0.1 or lower to about 2 parts per 100 parts of monomers.

Various types of emulsifiers can be used. The types of emulsifiers used in emulsion polymerizations are the anionic, nonionic and cationic emulsifiers. Emulsifiers of these groups commonly used in acrylate and methacrylate emulsion polymerization systems have been employed with success in the present case, as illustrated in the subsequent examples. The emulsion polymer can be used as such, thickened with thickening agents, such as polyvinyl alcohol, water soluble polyacrylates, water soluble cellulosic derivatives, etc. The polymer can be separated from the polymerization medium by coagulation with acids, salts, or by freezing. The resulting coagulum may then be washed and dried.

The polymers may be cross-linked either by means of an organic peroxide or by means of polyfunctional compounds cabable of reacting with free carboxylic acid groups in the polymer.

The following examples are intended to illustrate more fully the nature of the present invention without serving as a limitation upon its scope. In each of the examples, the polymerization was carried out in a glass vessel, suitably equipped with stirrer, thermometer, condenser, and means for flushing the interior with nitrogen gas. The vessel was flushed with nitrogen before beginning the polymerization, and a slight positive pressure of nitrogen was maintained in the vessel during polymerization. In each case the parts are by weight unless otherwise noted.

EXAMPLE 1

To a solution of 11.7 parts 2-(t-butylamino)ethanol, dissolved in 37.5 parts chloroform, was added slowly with stirring, 9.8 parts maleic anhydride dissolved in 37.5 chloroform; during this addition the temperature rose from 25–55° C. Upon completion of the addition, the product began to crystallize slowly. The solution was then allowed to stand for four days, 44 parts benzene added and product isolated by filtration. The white crystalline solid was found, by non-aqueous titration, to have a neutralization equivalent of 218 (calculated value 215).

To 175 parts of water containing 3.6 parts of an 80% aqueous solution of an organic phosphate (QS–44, Rohm and Haas) as emulsifying agent there were added 7.7 parts of concentrated ammonium hydroxide to raise the pH to 8.5 to 9.0, 12.5 parts of the maleic acid monoester described above, and a mixture of 10 parts of ethyl acrylate and 73.6 parts of 2-ethylhexyl acrylate. There was then added 0.5 part of ammonium persulfate and the emulsion was heated to 60° C., after which there was introduced dropwise approximately one part of a 3% aqueous solution of sodium bisulfite until initiation occurred. After liberation of heat had ceased the stirring of the mixture was continued for one hour, after which the polymer was coagulated with acetic acid, washed and dried. Virtually complete conversion was obtained.

EXAMPLE 2

The procedure described in the first paragraph of Example 1 was repeated except that 45 parts of chloroform was used as the solvent, 17 parts of N-tert.-octylaminoethanol was substituted for the tert.-butylaminoethanol, and the temperature rose to 58° C. The product, the N-t-octylaminoethyl monoester of maleic acid, was crystallized by the addition of heptane.

To 200 parts of water containing 3.8 parts of an 80% aqueous solution of the emulsifier of Example 1 and 7.7 parts of concentrated ammonium hydroxide there were added 5 parts of the maleic acid monoester described in the preceding paragraph, 95 parts of n-butyl acrylate, and 0.5 g. ammonimum persulfate. The emulsion was heated to about 70° C., and a 3% aqueous solution of sodium bisulfite was added dropwise until initiation occurred, approximately 7.5 parts being required. Stirring was continued for about 1½ hours at room temperature after liberation of heat had ceased; the polymer, the weight of which corresponded very closely to the calculated weight, was coagulated with methanol, washed, and dried.

EXAMPLE 3

To a solution of 39.2 parts maleic anhydride dissolved in 131 parts dry isopropyl acetate was added slowly 69.3 parts dry N,N-dibutylaminoethanol (Sipenol 2B1); the temperature rose from 38–51° C. during the addition of the alcohol. The solution was heated at 75° C. for two hours, then allowed to stand for 16 hours at room temperature, after which the solvent was evaporated to leave 108.3 parts of a viscous liquid, the maleic acid monoester of N,N-dibutylaminoethyl alcohol.

To 140 parts of water containing 10.6 parts of a 25% aqueous solution of nonylphenoxypoly (ethyleneoxy) ethanol (Igepal CO–970, about 90% ethylene oxide) and 4.0 parts of 100% nonylphenoxypoly (ethyleneoxy) ethanol (Igepal CO–630, about 65% ethylene oxide) as nonionic emulsifying agent there were added with stirring 19.0 parts of the maleic acid monoester described in the preceding paragraph, 7.0 parts of ethyl acrylate, and 51.5 parts of 2-ethylhexyl acrylate. The pH of the resulting emulsion was lowered to 3.0 by adding about 0.5 part of concentrated hydrochloric acid, it was cooled to 9° C., and about one part of 30% hydrogen peroxide was added. About 0.8 part of an aqueous solution of 1% ferrous ammonium sulfate and 4% ascorbic acid was then added slowly until initiation of the polymerization reaction occurred, the temperature rising to 23° C. Additional reductant solution was then added to a total of 3.5 parts. After completion of polymerization the polymer was coagulated by adding methanol at 60° C., washed, and dried.

EXAMPLE 4

The procedure described in the first paragraph of Example 1 was repeated except that 27 parts of maleic anhydride dissolved in 132 parts of benzene was used, 100 parts of "Priminox T–1M" was substituted for the t-butylaminoethanol, and the temperature rose from 27° to 36° C. After the reaction mixture had been allowed to stand for 16 hours at room temperature the solvent was evaporated to leave the product, the maleic acid monoester of mixed N-t-alkylaminoethyl alcohols in which the average number of carbon atoms in the alkyl groups was about 22. The product was a sticky viscous non-crystalline semi-solid material.

To 200 parts of water containing 13.7 parts of Igepal CO–970 (25% active) and 5.2 parts of Igepal CO–630 were added with stirring a mixture of 20 parts of the maleic acid monoester described in the preceding paragraph and 80 parts of n-butyl acrylate. The pH of the emulsion was reduced to 3.0 by adding 2.4 parts of concentrated hydrochloric acid, the temperature was lowered to 12° C., about one part of 30% aqueous hydrogen peroxide was added, and about 0.5 part of an aqueous solution containing 1% ferrous ammonium sulfate and 4% ascorbic acid was added to initiate polymerization, whereupon the temperature rose to 43.5° C. After liberation of heat ceased, an additional 2.5 parts of the reductant solution was added, the mixture was stirred 1¼ hours at room temperature, and the polymer was then coagulated by adding methanol, washed, and dried.

EXAMPLE 5

The procedure described in the first paragraph of Example 3 was repeated except that 98 parts maleic anhydride dissolved in 430 parts dry isopropyl acetate was used, and 225 parts of Priminox R–1M was substituted for the t-butylaminoethanol. After the reaction mixture had been allowed to stand for one hour at room temperature, the solvent was removed by distillation, leaving the product, the maleic acid monoester of mixed N-t-alkyl-aminoethyl alcohols having an average of about 12 carbon atoms in the alkyl groups. The product was a sticky viscous non-crystalline semi-solid material.

To 150 parts of water containing 9.8 parts of Igepal CO–970 (25% solution) and 3.7 parts of Igepal CO–630 were added with stirring 21.2 parts of the maleic acid monoester described in the preceding paragraph and a mixture of 6.0 parts of ethyl acrylate and 44.2 parts of 2-ethylhexyl acrylate. The pH of the resulting emulsion was reduced to 3.0 by adding 3.6 parts of concentrated hydrochloric acid, the emulsion was cooled to about 8° C., and about one part of 30% aqueous hydrogen peroxide was added. The solution of reductants was added to initiate and carry on the polymerization as in Example 4; after liberation of heat ceased, stirring of the reaction mixture continued for 1¼ hours at room temperature, and the polymer was then coagulated by the addition of methanol, washed and dried.

EXAMPLE 6

To 150 parts of water containing 1.5 parts of the emulsifying agent solution of Example 1 there were added with stirring about 7.7 parts of concentrated ammonium hydroxide and a mixture 17.7 parts of the maleic acid monoester described in Example 5, 5.0 parts of ethyl acrylate, 36.8 parts of 2-ethylhexyl acrylate, and 1.8 parts of acrylic acid. The pH of the resulting emulsion was about 8.0 After cooling the emulsion to approximately 13° C. there were added 0.3 part ammonium persulfate and sufficient aqueous solution of reductant, 0.2% ferrous ammonium sulfate and 3% ascorbic acid, to initiate the polymerization. After liberation of heat ceased, an additional 0.08 part of ammonium persulfate was added as well as more reductant solution, to a total of five parts. After stirring for 1½ hours at room temperature, the polymer was coagulated from the emulsion by first acidifying to pH 6 with acetic acid, then adding methanol.

The tack of the adhesives can be determined by a probe tack testing device as described in U.S. Patent 3,214,971 issued Nov. 2, 1965. In this test the polished tip of a 0.5 cm. diameter stainless steel probe is brought into contact with the adhesive under 100 g. per square cm. pressure for one second at 25° C. The maximum force in grams required to separate the probe from the adhesive at the instrument speed of one cm. per second is taken as the tack value.

The peel adhesion values are the forces required to remove an adhesive tape from a stainless steel surface after contact therewith for 2 minutes or 16 hours at a temperature of about 70° F. The tape was stripped from the surface at a 180° angle. A tape having a flexible backing one inch in width coated with the polymer is used in the test.

The creep resistance test is designed to test the resistance of the adhesive coating to shearing within the plane of the adhesive coating. A one inch strip of tape is applied to a vertical stainless steel surface, which surface is heated to 160° F. A 1 kg. weight is hung from the bottom end of the tape, which hangs freely from the metal surface. The 160° F. creep resistance is reported as the time it takes for the tape to move downwardly at least ½″ from its original position on the steel surface under the stress applied by the 1 kg. weight.

A thin coating of each of the polymers of Examples 1 to 6 was spread from a solution thereof in a volatile organic solvent upon a flexible polyethyleneterephthalate film backing and dried. The adhesive sheet or tape so produced was tested to determine probe tack, peel adhesion and creep resistance. In similar fashion, the same properties were measured for a mixture of the polymers with various proportions of a thermoplastic phenolic resin (Durez 19900) or a rosin ester (Staybellite Ester #10), as well as for the polymers, in some cases, after cross-linking by mixing with the specified cross-linking agents and heating for the indicated time and temperature. The results are summarized in the following table:

TABLE I

| Polymer Composition | Probe Tack (g.) | Peel adhesion 2 min. (oz.) | Creep, hrs. at— 75° F. | 160° F |
|---|---|---|---|---|
| A. Example 1 | 570 | | 0.75 | 0.02 |
| B. Example 1 plus 10% phenolic resin | 935 | | | 0.015 |
| C. Example 1 cross-linked for 5 min. at 350° F. with 1% tetraethylene pentamine and 1% Epoxide 201 | 590 | 50 | | 8.2 |
| D. Example 2 | 630 | | 10.8 | 0.23 |
| E. Example 2 plus 20% phenolic resin | 1,180 | 55 | | 0.02 |
| F. Example 2 cross-linked for 10 min. at 250° F. with benzoyl peroxide | 600 | 24 | | (¹) |
| G. Example 3 | 560 | 30 | 1.5 | 0.01 |
| H. Example 3 plus 10% phenolic resin | 660 | | | 0.025 |
| I. Example 4 | 540 | 20 | 83.5 | 1.6 |
| J. Example 4 plus 20% rosin ester | 770 | 43 | | 0.57 |
| K. Example 5 | 540 | | 1.0 | 0.03 |
| L. Example 6 | | | | |
| M. Example 6 cross-linked for 10 min. at 250° F. with benzoyl peroxide | 560 | 32 | | (¹) |

¹ No creep.

The foregoing test results show that compositions A, B, D, H, K, and L, which were too soft to provide peel adhesion values, are useful as adhesives when dissolved in a volatile solvent and employed as a cement, even though they were too soft to be useful as pressure-sensitive adhesives. The remaining compositions were all useful as pressure-sensitive adhesives. In addition, the tests show that the tack of polymers of Examples 1 to 4 inclusive can be further increased by the addition of other resins.

Although specific embodiments of the invention have been described herein, it is not intended to limit the invention solely thereto but to include all of the variations and modifications which suggest themselves within the spirit and scope of the appended claims.

What is claimed is:

1. A monoester of an acid selected from the class consisting of maleic, itaconic, and citraconic with an alcohol having the structure

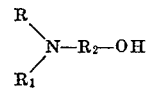

in which R represents an alkyl group having from 1 to 28 carbon atoms, $R_1$ represents a member of the class consisting of hydrogen and an alkyl group having from 1 to 10 carbon atoms, and $R_2$ is an alkylenyl group having from 2 to 3 carbon atoms.

2. A monoester as claimed in claim 1 in which the acid is maleic acid, $R_1$ is hydrogen, and $R_2$ has 2 carbon atoms.

3. A monoester as claimed in claim 1 in which the acid is maleic, $R_1$ is alkyl having from 1 to 10 carbon atoms, and $R_2$ has 2 carbon atoms.

4. A monoester as claimed in claim 2 in which the monoester is a mixture of monoesters in which the R groups differ in number of carbon atoms and have an average number of carbon atoms from 8 to 24.

5. A monoester as claimed in claim 2 in which the monoester is a mixture of monoesters in which the R groups are branched alkyl groups differing in number of carbon atoms, the average number of carbon atoms being from 11 to 14.

6. A monoester as claimed in claim 2 in which the monoester is a mixture of monoesters in which the R groups are branched alkyl groups differing in number of carbon atoms, the average number of carbon atoms being from 18 to 21.

References Cited

UNITED STATES PATENTS

| | | | |
|---|---|---|---|
| 2,723,195 | 11/1955 | Blake | 260—78.5 |
| 3,255,155 | 6/1966 | Siegel et al. | 260—78.5 |
| 3,342,787 | 9/1967 | Muskat | 260—78.5 |

JOSEPH L. SCHOFER, Primary Examiner

JOHN KIGHT, Assistant Examiner

U.S. Cl. X.R.

156—332; 260—78.5